United States Patent [19]

Payne

[11] Patent Number: 4,817,864
[45] Date of Patent: Apr. 4, 1989

[54] TEMPERATURE COMPENSATION FOR VAV SYSTEM

[75] Inventor: Peter P. Payne, Wheeling, Ill.

[73] Assignee: Honeywell Inc., Minneapolis, Minn.

[21] Appl. No.: 220,949

[22] Filed: Jun. 20, 1988

Related U.S. Application Data

[63] Continuation of Ser. No. 901,966, Aug. 28, 1986, abandoned, which is a continuation of Ser. No. 720,113, Apr. 14, 1985, abandoned.

[51] Int. Cl.⁴ .......................................... F24F 13/10
[52] U.S. Cl. .................................... 236/49.4; 98/1.5; 98/115.1; 165/22; 165/31
[58] Field of Search ............ 236/49 C; 98/1.5, 115.1, 98/115.3; 165/15, 22, 31, 40

[56] References Cited

U.S. PATENT DOCUMENTS

| | | | |
|---|---|---|---|
| 2,104,851 | 1/1938 | Crawford | 165/15 X |
| 2,491,461 | 12/1949 | Wood | 165/15 |
| 3,130,908 | 4/1964 | Henne | 236/49 |
| 3,402,654 | 9/1968 | Berst | 98/1.5 |
| 3,923,244 | 12/1975 | Osheroff | 236/49 |
| 4,231,515 | 11/1980 | Ring, Jr. | 236/87 |
| 4,284,236 | 8/1981 | Bradshaw | 236/49 |
| 4,291,832 | 9/1981 | Ginn et al. | 236/49 |
| 4,352,349 | 10/1982 | Yoho | 126/299 R |
| 4,366,534 | 12/1982 | Kompelien | 364/183 |
| 4,372,195 | 2/1983 | Dorius | 98/115 R |
| 4,386,733 | 6/1983 | Bradshaw | 236/49 |
| 4,394,869 | 7/1983 | Avery | 236/49 X |
| 4,399,862 | 8/1983 | Hile | 165/2 |
| 4,407,185 | 10/1983 | Haines et al. | 98/1.5 |
| 4,428,529 | 1/1984 | Bentsen | 236/49 |
| 4,489,881 | 12/1984 | Dean et al. | 236/49 |

Primary Examiner—William E. Tapolcai
Attorney, Agent, or Firm—Donald J. Lenkszus

[57] ABSTRACT

A temperature compensation control system for stabilizing the temperature within a space as the amount of air being supplied to the space undergoes sudden changes, the space being supplied with supply air through a supply duct, the supply duct having a temperature controller located therein, the space also having a return/exhaust duct associated therewith for removing air from the space, the system including a temperature sensor for sensing the temperature of the space, an air changing sensor for sensing changes in the air supplied to the space, and a controller for controlling the temperature of the space in response to the temperature sensor and for overriding the temperature sensor in response to sudden changes in the air being supplied to the space, the overriding of the temperature sensor decaying in accordance with time.

26 Claims, 3 Drawing Sheets

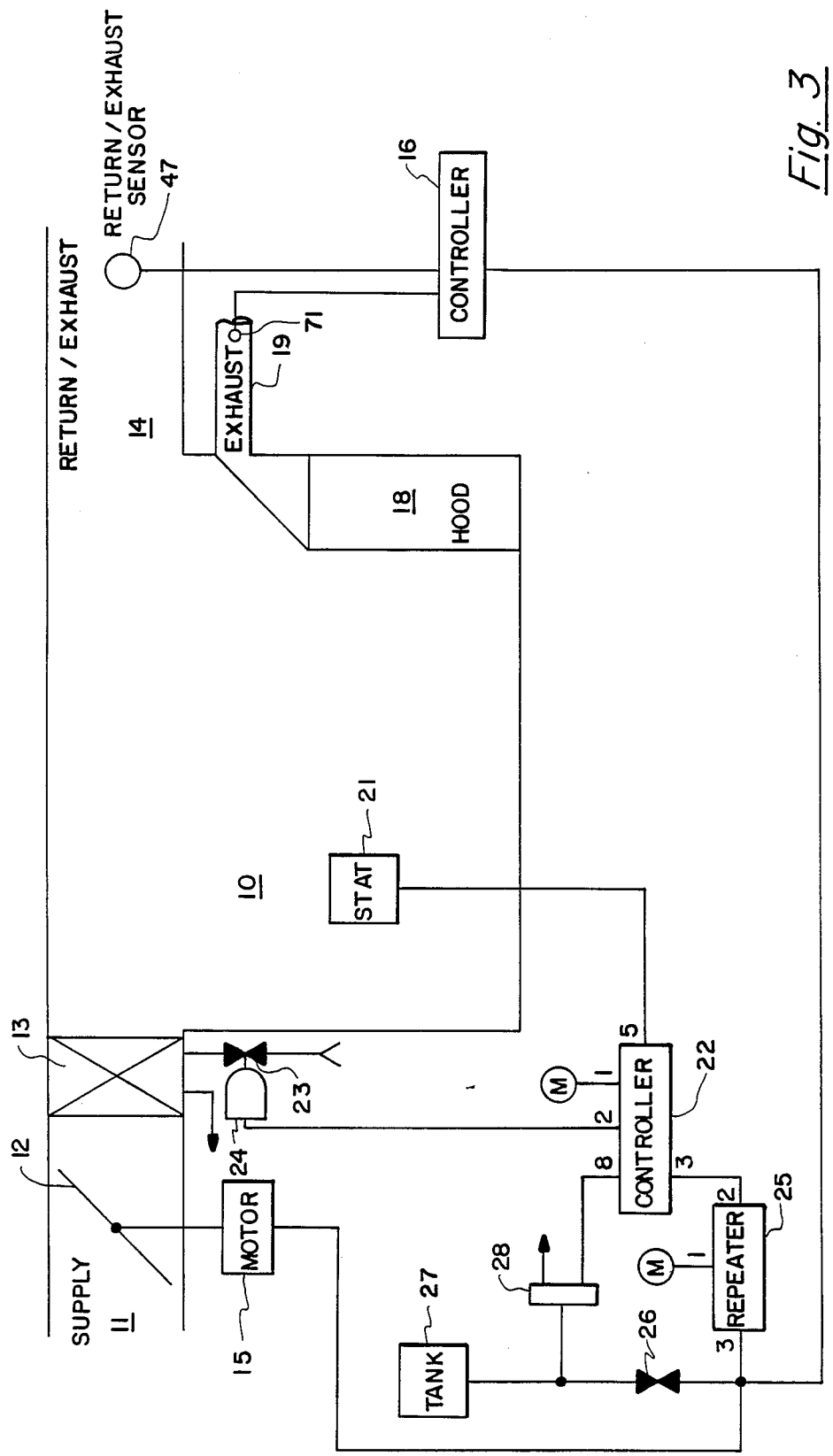

TEMPERATURE COMPENSATION FOR VAV SYSTEM

This application is a continuation of application Ser. No. 901,966 filed Aug. 28, 1986, now abandoned, which was a continuation of application Ser. No. 720,113, filed Apr. 14, 1985, now abandoned.

BACKGROUND OF THE INVENTION

The present invention relates to a control system which compensates for temperature changes resulting from sudden changes in the amount of air being supplied to a space.

In typical buildings having variable air volume systems for supplying termperature controlled air to a space, a supply duct is provided for carrying air driven by a fan to the space. A damper is included within the supply duct for controlling the amount of air being supplied to the space and a reheat coil may also be included in the supply duct for reheating the temperature of air being supplied by the supply duct to the space.

The reheat coil may be necessary, for example, in those systems in which a fan system will supply air through a plurality of ducts to a plurality of spaces. The temperature of the air being supplied by the fan system is typically controlled to satisfy the space requiring the most temperature treatment. Thus, the damper to that space may be wide open. The dampers of the other spaces may be at some position in order to control the temperature of the space and the static pressure within the space. A space may have air flow or static pressure requirements which will result in too much cool air (in summer operation, for example) being supplied to the space to meet the temperature requirements of that space. Thus, the flow sensor or static pressure sensor can open up the damper to a sufficient extent to satisfy the air quantity requirements for the space and the reheat coil can be used to elevate the temperature to satisfy the thermostat located within the space.

In such systems, however, conditions can occur which might require sudden changes in the amount of air being supplied to the space. For example, the startup of exhaust hoods, i.e. those which are found in laboratories to exhaust corrosive fumes from the space rather than allowing those fumes to migrate into the space, may require the supply damper to open more to make up for air withdrawn from the space by the exhaust hood. If a simple thermostat is included in the system for controlling the temperature of the space, any temperature change which results from a sudden change in the amount of air being supplied to the space must work its way through the space to the thermostat and then through the thermostat and the control system back to the temperature controlling apparatus before the temperature can be brought back to the desired level. This process can take quite some time. The result is occupant discomfort for the duration of this time. In order to avoid this delay in the temperature control system which is inherent in prior art systems, special provision must be made in order to begin temperature compensation as soon as possible after the sudden change in the amount of air being supplied to the space occurs.

SUMMARY OF THE INVENTION

Accordingly, the present invention relates to a temperature compensation control system for stabilizing the temperature within a space as the amount of air being supplied to the space undergoes sudden changes. The space is supplied with supply air through a supply duct, the supply duct having a temperature controlling apparatus located therein, and the space also having a return/exhaust duct associated therewith for removing air from the space. The system has a temperature sensor for sensing the temperature of the space, an air pressure sensor for providing an output signal indicative of changes in the amount of air being supplied to the duct, and a controller responsive to the temperature sensor and to the air pressure sensor for controlling the temperature controlling apparatus according to the temperature of the space and for controlling the temperature controlling apparatus for stabilizing the temperature within the space even though the amount of air being supplied to the space suddenly changes.

BRIEF DESCRIPTION

These and other features and advantages will become more apparent from a detailed consideration of the invention when taken in conjunction with the drawings in which.

DETAILED DESCRIPTION

Figure 1:
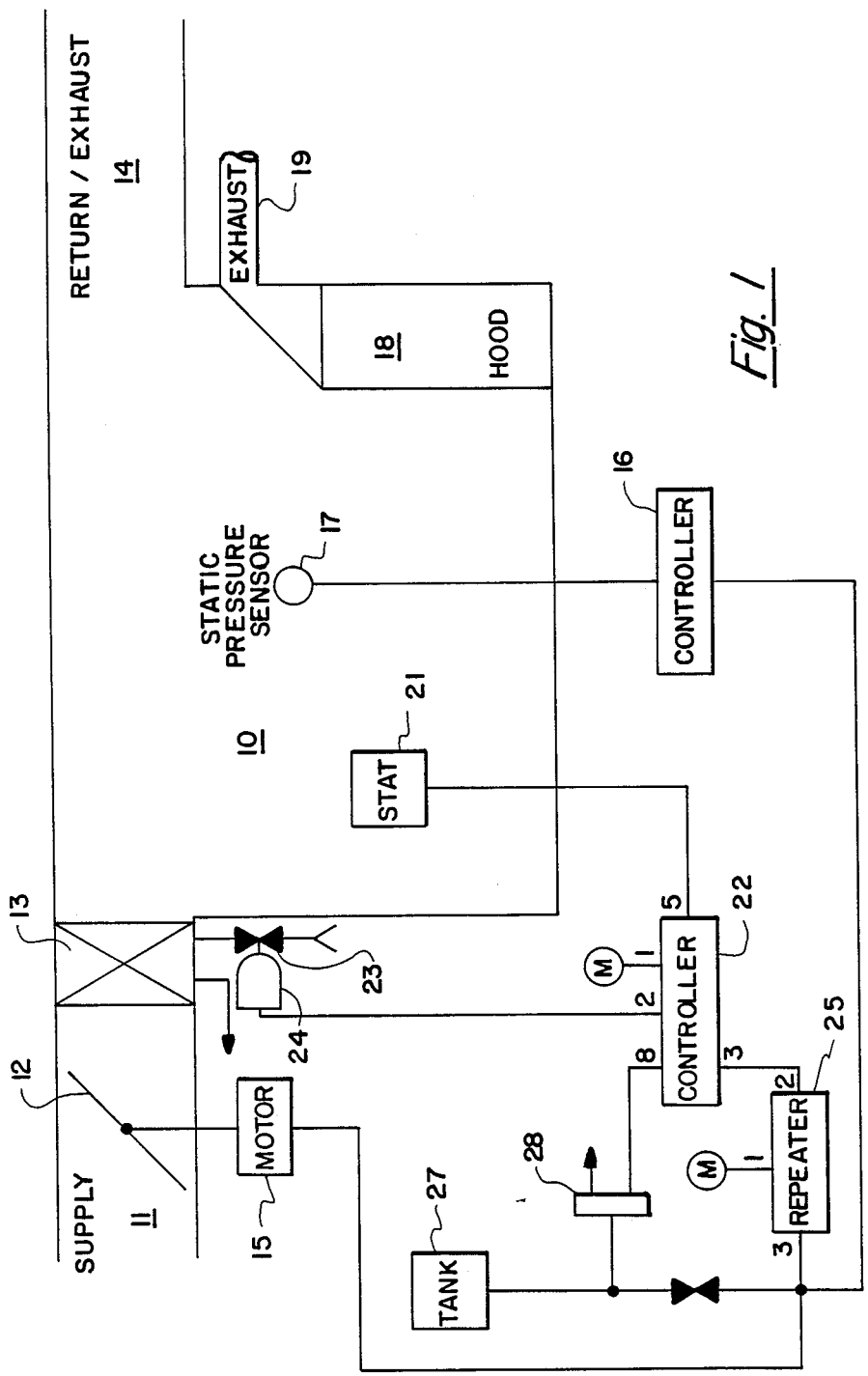
FIG. 1 shows a control system according to the invention wherein the control system is responsive to a static pressure sensor.

In FIG. 1, space 10 is supplied with air conditioned air from supply duct 11 as controlled by damper 12 and heat exchange coil 13 such as a reheat coil. Air supplied to space 10 is returned to the fan system through return duct 14, the details of the fan system not being shown herein since they do not form a part of the invention. Damper 12 is driven by motor 15 under control of controller 16. Controller 16 may be an RP920D manufactured by Honeywell. Controller 16 receives an input from static pressure sensor 17. Accordingly, when static pressure sensor 17 senses a change in static pressure within space 10, it appropriately changes its output which is sensed by controller 16 for driving motor 15 and damper 12 to a new position for adjusting static pressure within space 10.

Space 10 may be subject to sudden changes in static pressure as a result, for example, of the opening or closing of doors or the activation of an exhaust hood such as exhaust hood 18 shown in FIG. 1. When exhaust hood 18 is turned on, air is withdrawn from space 10 and exhausted through exhaust duct 19 by exhaust hood 18. The exhausting of air by exhaust hood 18 through exhaust duct 19 will accordingly reduce the static pressure within space 10 whereas the cessation of operation of draft hood 18 will raise the pressure within space 10. A change in the static pressure within space 10 will result in a change in the output signal from static pressure sensor 17 which will cause damper 12 to be adjusted accordingly hence readjusting the static pressure within space 10. Without a compensation apparatus in the system shown in FIG. 1, a change of damper position 12 will change the air being supplied to space 10 and will cause a change in temperature of the air within space 10. this change in temperature must migrate through space 10 to a thermostat 21 located within space 10 the thermostat 21 operates through controller 22, which may be an RP920B manufactured by Honeywell Inc. to adjust valve 23 by way of actuator 24. Actuator 24 controls the amount of hot water supplied to reheat coil 13, which adjusts the temperature of the air supplied to space 10. This operation may involve a substantial time lag.

The apparatus shown in FIG. 1 substantially eliminates this time lag by providing a mechanism responsive to any changes in the output from controller 16 as a result of a change in static pressure. This apparatus operates through controller 22 to make adjustments to reheat coil 13 without waiting for temperature changes to be reflected through thermostat 21 and controller 22. Accordingly, controller 16 is connected to the input of biasing repeater 25, which may be an Air Logic biasing repeater, the output of which is connected to one side of controller 22. Controller 16 is also connected through restriction 26 to volume tank 27. The junction of restriction 26 and volume tank 27 is connected through a repeater 28 which may be an RP470B manufactured by Honeywell Inc. The repeaters 25, 28 serve to pneumatically isolate the signals going into the controller so the controller will not consume the signal air (load it down). The biasing repeater also provides offset needed by the signal in port 3 of controller 22.

In operation, thermostat 21 normally has control through controller 22, actuator 24 and valve 23 of reheat coil 13. In response to a steep change in static pressure within space 10, the outputs from static pressure sensor 17 and controller 16 will likewise change. The signal change is delivered through repeater 25 to terminal 3 of controller 22. The restriction 26 prevents the signal change from immediately being connected to the other side of controller 22 at terminal 8. Thus, a differential pressure is formed across the controller which has the effect of adding to the thermostat signal, thus making an immediate adjustment to the valve 23 position. Accordingly, although thermostat 21 may not have yet sensed a change in temperature within space 10, valve 23 is adjusted in response to a change in the amount of air supplied by supply duct 11 to space 10 anticipating a change in temperature within space 0. The other side of restriction 26 is connected to volume tank 27. Volume tank 27 begins filling and thus reducing the pressure differential across restriction 26, and therefore the pressure differential across terminals 3 and 8 of controller 22 will gradually diminish until the pressure differential becomes 0. The thermostat gradually reserves full control. As a result, sudden changes in the amount of air supplied to space 10 are compensated by the control arrangement 22, 25–28 with thermostat 21 being allowed slowly to regain control as the temperature within space 10 as sensed by thermostat 21 slowly assumes the proper level.

This anticipation effect is proportional such that a small pressure change creates a small differential with a small compensating effect and a large pressure change creates a large differential with a large corresponding compensating effect.

Figure 2:
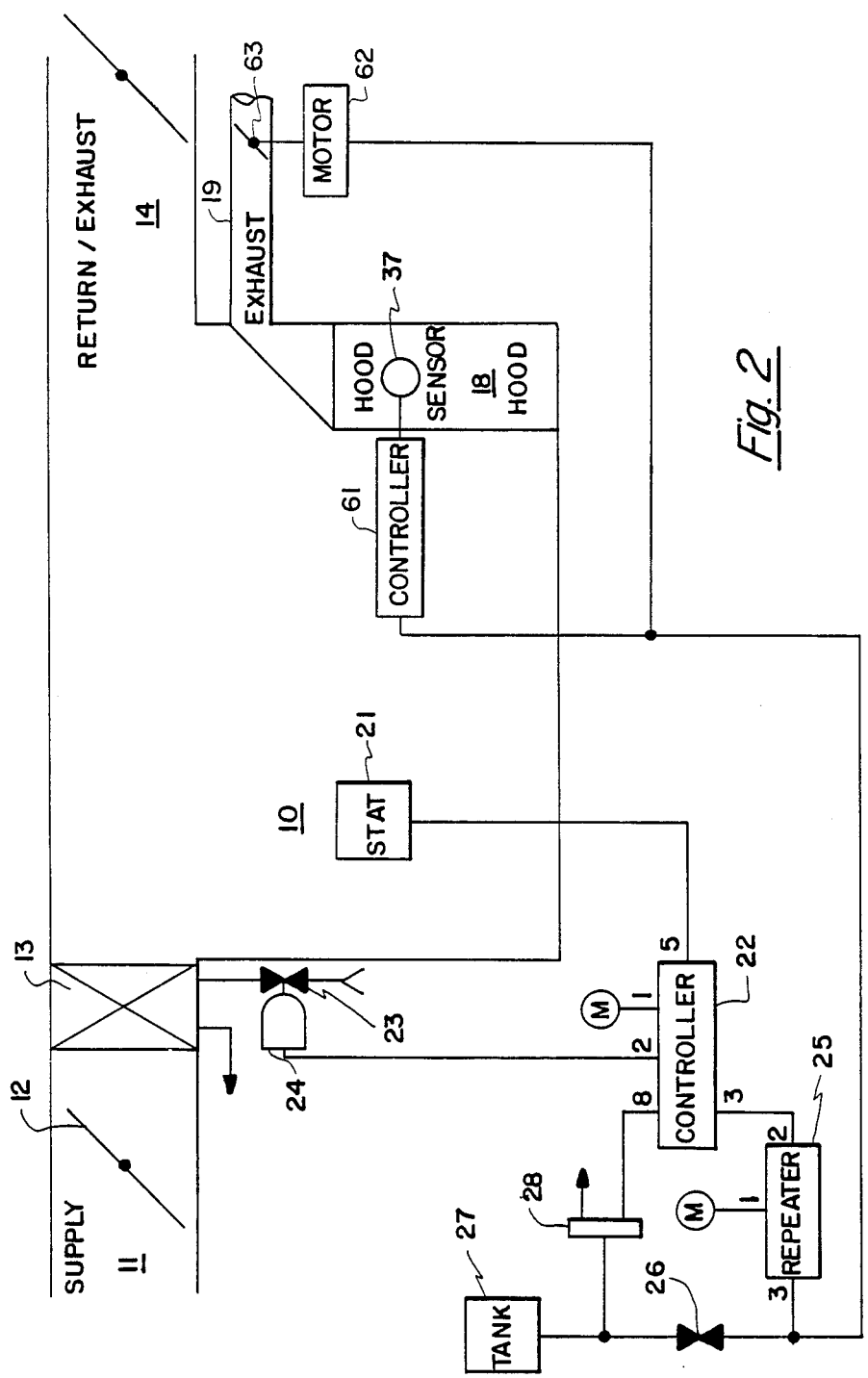
FIG. 2 shows a control system according to the invention wherein the control system is responsive to a hood sensor; and, FIG. 3 shows a control system according to the invention wherein the control system is responsive to a return sensor such as a return air flow sensor.

FIG. 2 is substantially similar to FIG. 1 and therefore the same reference numerals are used in both figures to depict common elements. In FIG. 2 the amount of air being supplied to space 10 is likewise directly affected by hood 18. Accordingly, when hood 18 is energized or deenergized the need to change supply flow can be sensed by a static pressure sensor within space 10 as in the case of FIG. 1 to control damper 12. Alternatively, flow tracking between return duct 14, exhaust duct 19 and supply duct 11 can be used to control damper 12 because any change in hood 18 will result in a change in return flow which can be used to change supply flow.

Sensor 37 in hood 18 which can be a static pressure sensor for sensing the static pressure within hood 18 or a flow sensor for sensing flow through the hood or a hood face velocity controller (i.e. CP 983), senses the flow requirements of hood 18. For example, if hood 18 is energized, sensor 37 will sense a change in the static pressure within or flow through hood 18 and provides a similar change in the output signal from controller 61. The output from controller 61 operates through motor 62 and damper 63 to control the exhaust from hood 18. The output from controller 61 also operates through control apparatus 25 through 28 to momentarily override or supplement the control of thermostat 21 for control of valve 23 and its actuator 24.

FIG. 3 is similar and similar reference numerals have been used. However, as shown in FIG. 3, a return sensor such as a flow sensor 47 is arranged within return duct 14 to detect changes in flow through return duct 14. Also, flow sensor 71 senses flow through exhaust 19 of hood 18. For example, if hood 18 is energized so that some of the air within space 10 is exhausted by exhaust duct 19, flow through return duct 14 and exhaust 19 will change. The change in outputs from sensors 47 and 71 are then used to adjust damper 12 through motor 15 and controller 16 is also used to adjust actuator 24 and valve 23 for maintaining temperature relatively constant within space 10.

The system according to the present invention could also be implemented for electric or electronic control. Thus, an RC circuit can replace the restriction/volume tank circuit, and a differential amplifier and controller could be substituted for the controller 22.

The embodiments of the invention in which an exclusive property or right is claimed are defined as follows:

1. A temperature compensation control system for stabilizing the temperature within a space as the amount of air being supplied to said space undergoes sudden changes, said space being supplied with supply air through a supply duct, said supply duct having a temperature controlling means located therein, said space also having a return and/or exhaust duct associated therewith for removing air from said space, said system comprising:
   temperature sensing means for sensing the temperature of said space;
   first means for providing an output signal indicative of a change in air pressure within said space; and,
   controller means responsive to said temperature sensing means and to said output signal for controlling said temperature controlling means according to said temperature of said space and for controlling said temperature controlling means for stabilizing said temperature within said space responsive to said output signal, said controller means having a temperature input connected to said temperature sensing means and an input connected to said first means.

2. The system of claim 1 wherein said output signal comprises a static pressure sensor for sensing the static pressure within said space, said static pressure sensor being connected to said controller means.

3. The system of claim 1 wherein said output signal sensing means comprises a hood sensor for sensing the energization state in an exhaust hood which is located within said space, said hood sensor being connected to said controller means.

4. The system of claim 1 wherein said outut signal sensing means comprises a return/exhaust air sensor located in said return/exhaust air duct, said return/exhaust air sensor being connected to said controller means.

5. The system of claim 4 wherein said return/exhaust air sensor comprises a flow sensor.

6. The system of claim 1 wherein said first means comprises means for providing a differential signal in response to a change in the amount of air being supplied to the space, said differential signal decreasing as a function of time and being supplied to said controller means.

7. The system of claim 6 wherein said first means comprises a static pressure sensor for sensing the static pressure within said space, said static sensor pressure being connected to said controller means.

8. The system of claim 6 wherein said first means comprises a hood sensor for sensing the energization state in an exhaust hood which is located within said space, said hood sensor being connected to said controller means.

9. The system of claim 6 wherein said first means comprises a return/exhaust air sensor located in said return/exhaust air duct, said return/exhaust air sensor being connected to said controller means.

10. The system of claim 6 wherein said first means comprises a volume tank and restriction means connected to said volume tank for applying said differential signal to said controller means.

11. The system of claim 10 wherein said first means comprises a static pressure sensor for sensing the static pressure within said space, said static pressure sensor being connected to said controller means.

12. The system of claim 10 wherein said first means comprises a hood sensor for sensing the energization state in an exhaust hood which is located within said space, said hood sensor being connected to said controller means.

13. The system of claim 10 wherein said first means comprises a return/exhaust air sensor located in said return/exhaust air duct, said return/exhaust air sensor being connected to said controller means.

14. The system of claim 1 wherein said controller means comprises a controller connected to said temperature sensing means for controlling said temperature controlling means, and wherein said first means comprises a volume tank, restriction means connected to said volume tank, and an air pressure sensor connected to said restriction means, said first means being connected to said controller for applying a differential signal across said controller as a result of changes in the air supplied to said space, said differential signal decreasing as a function of time.

15. The system of claim 14 wherein said output signal comprises a static pressure sensor for sensing the static pressure within said space, said static pressure sensor being connected to said controller.

16. The system of claim 14 wherein said output signal comprises a hood sensor for sensing the energization state in an exhaust hood which is located within said space, said hood sensor being connected to said controller.

17. The system of claim 14 wherein said output signal comprises a return/exhaust air sensor located in said return/exhaust air duct, said return/exhaust air sensor being connected to said controller.

18. A temperature compensation control system for stabilizing the temperature within a space as the amount of air being supplied to said space undergoes sudden changes, said space being supplied with supply air through a supply duct, said supply duct having a temperature controlling means located therein, said space having a return/exhaust duct associated therewith for returning/exhausting air from said space, said system comprising:

temperature sensing means for sensing the temperature of said space;

first means for providing an output signal indicative of a change in air pressure within said space; and, controller means connected to said temperature sensing means and connected to said output signal such that any change in said output signal is applied to said controller means and decays with time, said controller means comprising means for controlling said temperature controlling means according to said temperature of said space and for overriding said temperature sensing means in response to sudden changes in said air pressure being supplied to said space, said overriding of said temperature sensing means decaying as a function of time.

19. The system of claim 18 wherein said output signal comprises a static pressure sensor for sensing the static pressure within said space, said static pressure sensor being connected to said controller means.

20. The system of claim 18 wherein said output signal comprises a hood sensor for sensing the energization state in an exhaust hood which is located within said space, said hood sensor being connected to said controller means.

21. The system of claim 18 wherein said output signal comprises a return/exhaust air sensor located in said return/exhaust air duct, said return/exhaust air sensor being connected to said controller means.

22. The system of claim 21 wherein said return/exhaust air sensor comprises a flow sensor.

23. The system of claim 18 wherein said controller means comprises a controller connected to said temperature sensing means for controlling said temperature controlling means, and wherein said output signal comprises a volume tank, restriction means connected to said volume tank, and a rate of change sensor connected to said restriction means, said rate of change sensing means being connected to said controller for applying a differential signal across said controller as a result of changes in the air supplied to said space, said differential signal decreasing as a function of time.

24. The system of claim 23 wherein said output signal comprises a static pressure sensor for sensing the static pressure within said space, said static pressure sensor being connected to said controller.

25. The system of claim 23 wherein said output signal comprises a hood sensor for sensing the energization state in an exhaust hood which is located within said space, said hood sensor being connected to said controller.

26. The system of claim 23 wherein said output signal comprises a return/exhaust air sensor located in said return/exhaust air duct, said return/exhaust air sensor being connected to said controller.

* * * * *